Feb. 16, 1971 K. M. WATKINS 3,564,448

REDUNDANT OSCILLATOR SYSTEM

Filed Nov. 13, 1968

WITNESSES:
Leon M. Garman
James F. Young

INVENTOR
Kenneth M. Watkins
BY
ATTORNEY

United States Patent Office 3,564,448

Patented Feb. 16, 1971

3,564,448

REDUNDANT OSCILLATOR SYSTEM

Kenneth M. Watkins, Williamsville, N.Y., assignor to Westinghouse Electric Corporation, Pittsburgh, Pa.

Filed Nov. 13, 1968, Ser. No. 775,383
Int. Cl. H03k *3/00*
U.S. Cl. 331—49 8 Claims

ABSTRACT OF THE DISCLOSURE

A redundant oscillator system wherein a plurality of pulse generators each generate first pulses in response to reset inputs. Each of the pulse generators supplies first pulses to an associated one of a plurality of gate circuits each of which also receives first pulses from a nonassociated one of the generators and supplies second pulses in response thereto. A reset circuit is provided to translate the second pulses from each of the gating circuits to the nonassociated ones of the plurality of pulse generators with output pulses of a predetermined frequency being provided from the system in response to the second pulses.

BACKGROUND OF THE INVENTION

Field of the invention

The present invention relates to oscillator systems and, more particularly, to oscillator systems for providing redundant outputs.

Description of the prior art

A redundant system may be broadly considered as one where a common output may be provided from a plurality of sources. It would be ideal if the common output could be maintained even if one or more of the plurality of sources should fail or malfunction. The continuation of the output independent of the failure of one or more of the sources is particularly important when the system is to supply a critical load, which may comprise part of a process that if interrupted would be destructive of the process and possibly the equipment utilized therein. Hence it becomes essential that the output be supplied at all times to the critical load, and accordingly a redundant system greatly increases the probability that the output will be maintained.

In an oscillator system where a plurality of individual oscillators are to be utilized either to supply a common output or a plurality of individual outputs, to supply a common output individual it is necessary, in many instances, that these individual outputs be held in synchronism. This is particularly important when a plurality of inverters are connected in parallel, that is, the outputs of the individual inverters are connected to supply a common output bus, and control inputs to the inverters are supplied by the oscillator system. In order to insure the proper operation of the parallel connected inverter output, it is necessary that the control signal supplied to the individual oscillators be at a substantially constant frequency and in phase synchronism with each other. In U.S. Pat. No. 3,297,955, entitled "Plural Oscillators Synchronized to the Highest Frequency," separate oscillators are utilized for supplying the control signals to a plurality of parallel connected inverters with each of the oscillators being synchronized to the frequency of the individual oscillator having the highest operating frequency. One disadvantage of the system disclosed in this patent is that it does not have a redundant capability in that each of the parallel connected inverters is supplied from a separate oscillator. Thus, if one of the oscillators should fail the particular inverter associated therewith would be dropped out of the system. Another disadvantage is that all of the plurality of oscillators would be synchronized to the highest frequency provided by one of the individual oscillators. This means if one of the oscillators should malfunction and provide an excessively high frequency all of the other oscillators would be synchronized therewith so that excessively high frequency control signals would be provided to each of the inverters. This, of course, would be undesirable and would be disruptive of the entire inverter system. It can thus be seen that it would be highly desirable to provide an oscillator system utilizing a plurality of oscillators which has a redundant capability for supplying common output signals which could be utilized as the control signals for a plurality of parallel connected inverters and wherein the system which would not be synchronized to the highest frequency of operation of the individual oscillators but on another frequency of operation which would provide highly stable frequency control signals.

SUMMARY OF THE INVENTION

The present invention broadly relates to the redundant oscillator system wherein a plurality of generating means selectively supply a plurality of gating means with the output of the gating means being utilized to control the output of the generating means. The system is so interconnected that it provides output signals to a common output even if one generating means should fail, with the output signals being in synchronism at a predetermined frequency.

DESCRIPTION OF THE PREFERRED EMBODIMENT

Figure 1:
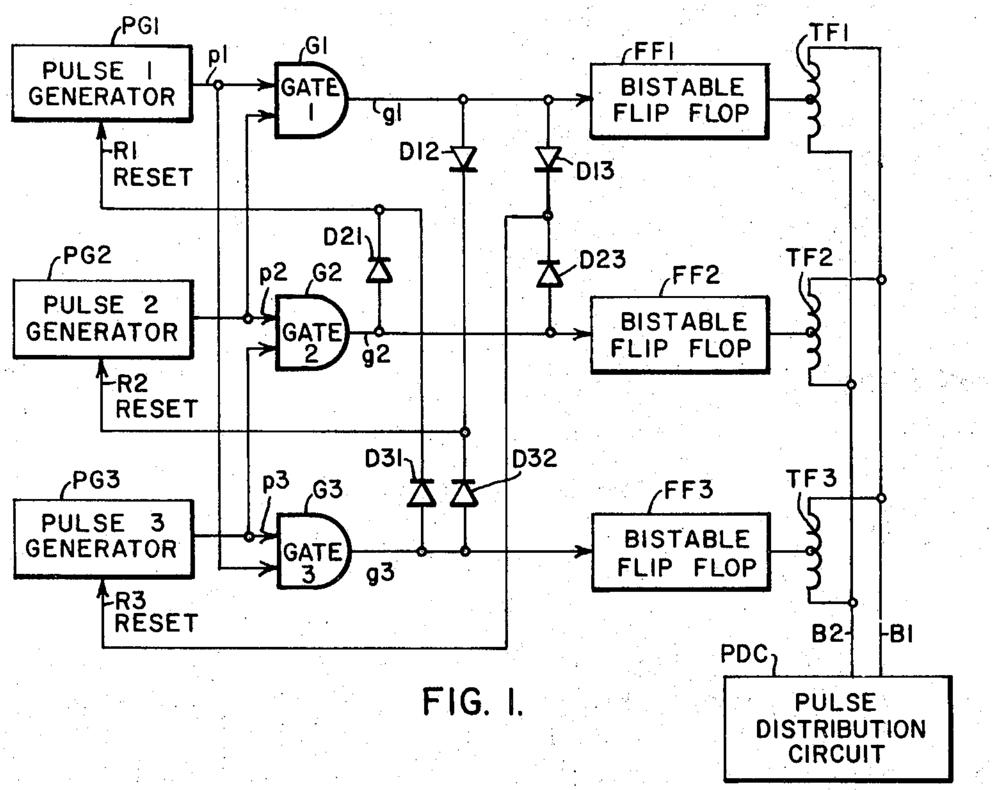
FIG. 1 is a schematic block diagram of the redundant oscillator system of the present invention.

Referring to FIG. 1, the redundant oscillator system of the present invention is shown including three pulse generators PG1, PG2 and PG3 which each respectively supply pulse outputs with ideally a predetermined frequency that is a predetermined pulse repetition rate. The pulse generators PG1, PG2 and PG3, respectively, include reset inputs R1, R2 and R3 with the pulse generators being responsive thereto to reset the timing cycle pulse generation upon the reception of a reset pulse.

Associated respectively with each of the pulse generators PG1, PG2 and PG3 are the gates G1, G2 and G3 which comprise coincidence (AND) gates which upon the coincident reception of input pulses to the two inputs thereof provide an output pulses G1, G2 and G3, respectively. Each of the gates G1, G2 and G3 receives as one input thereto pulse outputs from the associated pulse generator PG1, PG2 or PG3. The other input to each of the gates G1, G2 and G3 is from the nonassociated of the pulse generators PG1, PG2 and PG3. Thus, the gate G1 receives as inputs thereto the outputs *p1* and *p2* of the pulse generators PG1 and PG2; the gate G2 receives as inputs the outputs *p2* and *p3* of the pulse generators PG2 and PG3 and the gate G3 receives as inputs the outputs *p3* and *p1* from the pulse generators PG3 and PG1.

The respective outputs *g1*, *g2* and *g3* of gates G1, G2 and G3 are applied when provided to bistable flip-flops FF1, FF2 and FF3, respectively, associated with the gates G1, G2 and G3. In response to the output from the respective gates G1, G2 and G3 the bistable flip-flops FF1, FF2 and FF3 change states and maintain that output state until the next input thereto is received from the associated gate G1, G2 or G3. For example, the first pulse input to any of the bistable flip-flops FF1, FF2 and FF3 will cause the flip-flop to go to a "set" state providing a ONE output which would be maintained until the second pulse input is received thereby which would cause the respective bistable flip-flop FF1, FF2 or FF3 to revert to its "reset" state providing a ZERO output. The respective outputs of the bistable flip-flops FF1, FF2 and FF3 are applied to the primary tap point of an associated autotransformer TF1, TF2 and TF3. The secondary outputs of the autotransformers TF1, TF2 and TF3 are connected in parallel across a pair of output busses B1 and B2. The output busses B1 and B2 supply a pulse distributing circuit PDC, which, in turn, distributes the pulses supplied by the busses B1 and B2 to pulse utilization means such as the gate control inputs of a plurality of parallel connected inverters.

Figure 2:
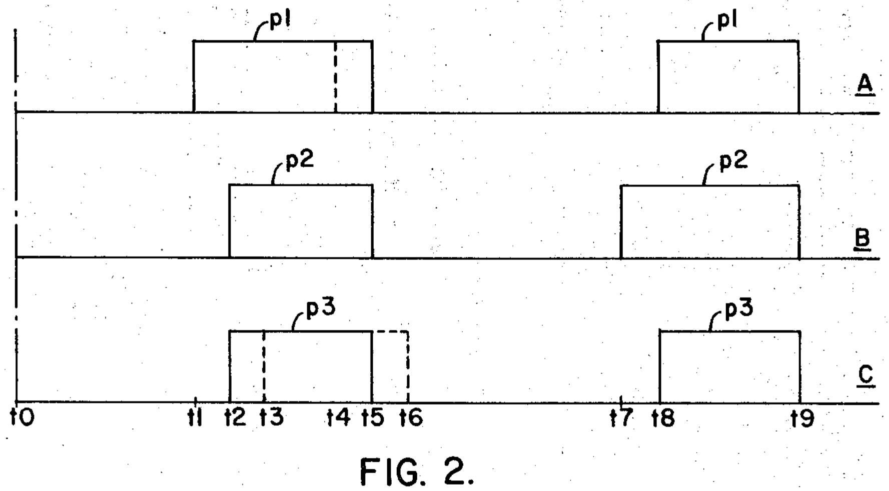
FIG. 2 is a waveform diagram including curves A, B and C which are utilized in explaining the operation of the system of FIG. 1.

Considering now also FIG. 2 which shows in curves A, B and C respectively thereof the pulse outputs *p1*, *p2* and *p3* of the pulse generators PG1, PG2 and PG3. Assume at a time TO that none of the pulse generators PG1, PG2 and PG3 are supplying output pulses *p1*, *p2* or *p3* therefrom. Also assume that, by chance, the pulse generator PG1 supplies the output pulse *p1*, curve A of FIG. 2 at a time *t1* while the other pulse generators PG2 and PG3 still do not supply output pulses. The pulse *p1* at time *t1* is applied as an input to gate G1 and an input to the gate G3. However, in that pulse generators PG2 and PG3 do not at this time supply respective output pulses *p2* and *p3*, neither the gate G1 nor the gate G3 supplies output *g1* or *g3* to the respective bistable flip-flops FF1 or FF3 and thus no output pulses are supplied at the output busses B1 and B2. This condition will persist until the time *t2* when the pulse generator PG2 supplies an output pulse *p2*, curve B of FIG. 2, to the associated gate G2 and also to the gate G1. In response to the coincidence at the time *t2* of the pulses *p1* and *p2*, the gate G1 supplies an output *g1* which triggers the bistable flip-flop FF1 whose output is translated through the transformer TF1 to be outputted at the common output busses B1 and B2.

The output pulse *g1* of the gate G1 is also translated to the reset input R2 of the pulse generator PG2 via a diode D12 connected from anode to cathode between the output of gate G1 and the reset input R2 which establishes the timing out time for the pulse generator PG2. Also the pulse *g1* is translated through a diode D13 connected between the output of gate G1 and the reset input R3 of the pulse generator PG3 to reset the pulse generator PG3 so that it supplies its output pulse *p3* substantially at the time *t2* as shown in solid lines in curve C of FIG. 2. The dotted line at a time *t3* in Curve C of FIG. 2 indicates that had a reset input not have been supplied to the pulse generator PG3 the pulse *p3* would not be provided until the time *t3*. However, due to the reset pulse being applied thereto at the time *t2* it supplies its output *p3* to the associated gate G3 and also to the gate G2. Thus at the time *t2* both the gates G2 and G3 receiving coincident into pulses will supply their respective outputs *g2* and *g3* to the associated bistable flip-flops FF2 and FF3 to provide outputs to the transformers TF2 and TF3, respectively, to supply common output busses B1 and B2. The outputs provided respectively from the transformers TF1, TF2 and TF3 across the common output busses B1 and B2 are thus in time coincidence occurring at the time *t2* in that all three gates G1, G2 and G3 essentially provide their output pulses *g1*, *g2* and *g3* at this time to trigger the three bistable flip-flops FF1, FF2 and FF3 associated respectively therewith at the time *t2*. Thus there is redundant generation of the pulse output across the busses B1 and B2 in response to each of the pulse generators PG1, PG2 and PG3.

The pulse generator PG1 which provided its output pulse *p1* at an earlier time than the generators PG2 and PG3 receives a reset input by the pulse *g2* being translated through a diode D21, connected from anode to cathode between the output of the gate G2 and the reset input R1 of pulse generator PG1, and also a reset input by the pulse *g3* being translated through a diode D31 being connected from anode to cathode between the output of the gate G3 and the reset input R1. These reset inputs cause the timing cycle of the pulse generator PG1 to be reset to start at the time *t2* and continues to be supplied until a time *t5* when normally, independent of a reset input the pulse *p1* would time out at a time *t4* earlier than the time *t5*. Thus each of the pulses *p1*, *p2* and *p3* as shown in curves A, B and C respectively of FIG. 2 time out at the time *t5*, when independent of the reset inputs to the pulse generator PG1 pulse *p1* would time out earlier at time *t4* and the pulse *p3* would time out at a later time *t6*.

A diode D23 is connected from anode to cathode between the output of gate G2 and the reset input R3 of the pulse generator PG3, and a diode D32 is connected between the output of the gate G3 from anode to cathode and the reset input R2 of the gate pulse generator PG2. These diodes will translate the output pulses *g2* and *g3*, respectively, through the diodes D23 and D32 to the reset inputs R2 and R3 of the pulse generators PG2 and PG3, respectively, to act as reset inputs therefor. It should be noted that the gate output pulses *g1*, *g2* and *g3*, respectively, are only applied to the associated one of the bistable flip-flops FF1, FF2 and FF3 due to the diode array utilized. Thus, the cathodes of the diodes D13 and D23 are commonly connected so that the diode D23 blocks gate pulses *g1* from being applied to the flip-flop FF2, and cathodes of the diodes D12 and D32 are connected so that the gate pulses *g1* are blocked from being applied to the flip-flop FF3. Conversely, the diode D13 blocks the gate pulses *g2* from being applied to the flip-flop FF1 and the diode D12 blocks gate pulses *g3* from being applied to the flip-flop FF1. The cathodes of the diodes D21 and D31 are connected so that diode D31 blocks gate signals *g2* from being applied to the flip-flop FF3, and the diode D21 blocks gate signals *g3* from being applied to the flip-flop FF2. It can thus be seen that the array of unidirectional devices comprising the diodes D12, D13, D21, D23, D31 and D32 constitutes a reset circuit which permits the translation of the gate pulses *g1*, *g2* and *g3* to reset the pulse generators nonassociated with the source of the gate pulse, while also blocking the gate pulses from being applied to nonassociated flip-flops.

During the next sequence of operation assume that the pulse generator PG2 is operating at the highest frequency and generates a pulse *p2* at a time *t7* while the pulse *p1* or *p3* does not occur until a later time *t8*. At the time *t7* the pulse *p2* is applied to both the gates G1 and G2; however, in that the gates G2 and G1 do not receive another input until the time *t8* no output gate pulse will be supplied by either of these gates G1 or G2 or the gate G3. Assume that the pulse generator PG1 is operating at the next highest frequency with respect to the highest frequency generator PG2. At the time *t8* pulse *p1* will appear which will be applied to both the gates G1 and G3. The gate G1 having applied thereto the pulses *p1* and *p2* will supply the gate pulse *g1* which will drive the bistable flip-flop FF1 to its alternate bistable condition, for example, the "reset" state. The gate pulse *g1* from the gate G1 is also translated via the diode D13 to act as a reset input R3 to the pulse generator PG3 which in response thereto provides a pulse *p3* at the time *t8* which is applied to the gate G3. The coincidence of the pulse *p3* with the pulse *p1* causes the gate G3 to supply gate pulse *g3* which activates the flip-flop FF3 at the time *t8*. The output *p3* of the pulse generator PG3 is also applied as the second input to the gate G2 which outputs a gate pulse *g2* to the flip-flop FF2 at the time *t8* resetting this flip-flop. The gate pulse *g1* is also translated via the diode D12 to be applied as the reset input to the pulse generator PG2 to reset its timing operation for the generation of pulse *p2* to commence at a time *t8* so that all three of the pulses *p1*, *p2* and *p3* will time out at a time *t9*.

Thus redundant outputs are supplied from the flip-flops FF1, FF2 and FF3 to the respective transformers TF1, TF2 and TF3 and thus to the common output busses B1 and B2 to be supplied to the pulse distributing circuit PDC. The respective unidirectional devices D12, D13, D21, D23, D31 and D32, as described above, block the respective gating pulses *g*1, *g*2 and *g*3 from being applied to nonassociated ones of flip-flops FF1, FF2 and FF3, while permitting the translation of the respective gating pulses to the nonassociated ones of the pulse generators PG1, PG2 and PG3 for the proper time resetting thereof.

From the foregoing explanation it can be seen that the output pulses applied to the common busses B1 and B2 are in synchronism with each other and, in essence, act as a single source of output pulses for utilization as, for example, the gate control circuits of parallel connected inverters. Moreover, it should be understood that the frequency or pulse repetition rate at which the system of FIG. 1 is synchronized is at the second highest frequency of the pulse generators PG1, PG2 and PG3. That is, in the cycle of operation described commencing at the time *t*1, the pulse generator PG1 was supplying pulses at the highest frequency while the pulse generator PG2 supplied pulses *p*2 at the second highest frequency, therefore the system would synchronize at the pulse rate of the pulse generator PG2. In the example beginning at the time *t*7 it was assumed that the pulse generator PG2 was supplying pulses at the highest frequency while the pulse generator PG1 supplied pulses at the second highest frequency and therefore the system would be synchronized at the pulse repetition rate of the pulses *p*1 of the pulse generator PG1. Hence if one of the pulse generators PG1, PG2 or PG3 should provide excessively high frequency pulses the system would still synchronize on the pulse generator providing the second highest frequency pulses which should be at the predetermined or desired frequency of operation of the system rather than the system synchronizing on the excessively high frequency pulses as would be the case in the prior art system described in Pat. 3,297,955.

Another important feature of the system of FIG. 1 is that it provides a redundant source of pulses at the output busses B1 and B2. That is, if one of the pulse generators PG1, PG2 on PG3 should fail to supply pulses *p*1, *p*2 or *p*3, output pulses would still be provided to the common busses B1 and B2 with the system continuing to operate as before. For example, if the pulse generator PG2 should fail to provide pulses *p*2 therefrom but with pulse generators PG1 and PG3 operating normally. Upon the coincidence of the pulses *p*1 and *p*3 to the input of the gate G3, the pulse *g*3 would be supplied therefrom which would activate the bistable flip-flop FF3 with the common busses B1 and B2 being supplied via the transformer TF3. A reset input would be supplied via the diode D31 to the reset input R1 of the pulse generator PG1 to establish its timing cycle. However, in that gates G1 and G2 only receive one input thereto neither of these gates will supply gate outputs *g*1 or *g*2. Therefore the flip-flops FF1 and FF2 will not be activated as long as the pulse generator PG2 is malfunctioning. However output pulses would be supplied from the channel including the pulse generator PG3, the gate G3, the flip-flop FF3 and the transformer TF3 to the common busses B1 and B2 which would continue to supply output pulses to the pulse distributing circuit PDC. The system operation could continue until corrective action is taken to repair the malfunction of the pulse generator PG2 and return to normal operation of the system.

Although the present invention has been described with a certain degree of particularity, it should be understood that the present disclosure has been made only by way of example and that numerous changes in the details of fabrication and in the combination and arrangement of parts, elements and components can be resorted to without departing from the spirit and scope of the present invention.

I claim as my invention:

1. In a redundant oscillator system for supplying output pulses the combination of:
- a plurality of gating means each one respectively supplying first pulses in response to a reset input being applied thereto;
- a plurality of gating means each one respectively associated with one of said plurality of pulse generating means for receiving said first pulses from the associated one of said plurality of pulse generating means and said first pulses from another one of said plurality of pulse generating means and in response thereto providing second pulses respectively therefrom;
- reset circuit means for applying said second pulses from each of said plurality of gating means as reset inputs to each of said plurality of pulse generating means except the associated of said plurality of pulse generating means; and
- a plurality of output means each one being associated with one of said plurality of gating means for receiving said second signals respectively from each of said plurality of gating means and providing said output pulses in response thereto.

2. The combination of claim 1 wherein:
- said plurality of pulse generating means each ideally supplying said first pulses at a predetermined repetition rate and being responsive to said reset input to adjust the repetition rate thereof toward the predetermined rate, and, if any of said plurality of pulse generating means should fail to supply said first pulses, said output pulses being generated in response to said first pulses supplied by the other of said pulse generating means.

3. The combination of claim 1 wherein:
- said plurality of gating means comprise coincidence gates operative to provide said second pulses in response to the coincidence of said first pulses applied thereto;
- said reset circuit means operatively connected between the output of said coincident gates supplying said second pulses and said reset input of each of said plurality of pulse generating means except the associated of said plurality of pulse generating means.

4. The combination of claim 3 wherein:
- said reset circuit means including means for blocking said second pulses from each of said plurality of gating means from being applied to all of said plurality of output means except the associated one of said plurality of output means.

5. The combination of claim 1 wherein:
- said plurality of pulse generating means including first, second and third pulse generating circuits;
- said plurality of gating means including first, second and third coincidence gates;
- said first coincidence gate receiving said first pulses from said first and second pulse generating circuits, said second coincidence gate receiving said first pulses from said second and third pulse generating circuits, and said third coincidence gates receiving said first pulses from said third and said first pulse generating circuits;
- said reset circuit means including,
- first means for translating said second signals from said first coincidence gate to the reset input of said second and third pulse generating circuits, respectively,
- second means for translating said second pulses from said second coincidence gate to the reset inputs of said first and third pulse generating circuits, respectively, and
- third means for translating said second pulses from said third coincidence gate to the reset inputs of said first and second pulse generating circuits, respectively;

said output means including first, second and third switching circuits for respectively receiving said second pulses from said first, second and third coincidence gates.

6. The combination of claim 5 wherein:

said first means includes first and second unidirectional devices being so poled to permit said second signals to be translated therethrough to the reset inputs of said second and third pulse generating circuits, respectively, and to block said second signals from said second and third coincidence gates, respectively, from being translated to said first switching circuit, said second means includes third and fourth unidirectional devices being so poled to permit said second signals to be translated therethrough to the reset inputs of said first and third pulse generating circuits, respectively, and to block said second signals from said first and third coincidence gates respectively, from being translated to said second switching circuit, said third means including fifth and sixth undirectional devices being so poled to permit said second signals to be translated therethrough to the reset inputs of said first and second pulse generating circuits, respectively, and to block said second signals from said first and second coincidence gates, respectively, from being translated to said third switching circuit.

7. The combination of claim 5 wherein:

said first, second and third pulse generating circuits supplying said first pulses ideally at a predetermined repetition rate, if any one of said first, second or third pulse generating circuits should have a higher pulse repetition rate, the associated one of said coincidence gates being operative to prohibit said second signals from being provided thereby until one of said first pulses is received by said associated one of said coincidence gates from another of said plurality of pulse generating circuits operating at the next highest pulse repetition rate, thereby causing said system to be synchronized at the said next highest repetition rate which is defined to be said predetermined repetition rate.

8. The combination of claim 1 wherein:

said plurality of pulse generating means supplying said first pulses ideally at a predetermined repetition rate, if any one of said plurality of pulse generating means should have a higher pulse repetition rate, the associated one of said plurality of gating means being operative to prohibit said second signals from being provided thereby until one of said first pulses is received by the said associated one of said gating means from the one of said plurality of pulse generating means operating at the next highest pulse repetition rate, thereby causing said system to be synchronized at the next highest repetition rate which is defined to be said predetermined repetition rate.

References Cited

UNITED STATES PATENTS

| | | | |
|---|---|---|---|
| 3,297,955 | 1/1967 | Corey et al. | 331—56X |
| 3,381,239 | 4/1968 | Lehman | 331—56 |
| 3,479,603 | 11/1969 | Overstreet, Jr. | 331—49X |

JOHN KOMINSKI, Primary Examiner

S. H. GRIMM, Assistant Examiner

U.S. Cl. X.R.

307—219; 328—61, 63; 331—55, 56